United States Patent
Yamamoto et al.

(10) Patent No.: US 11,708,472 B2
(45) Date of Patent: Jul. 25, 2023

(54) ADDITION-CURING SILICONE RESIN FOR PRODUCING HEAT-SHIELDING FILM, METHOD FOR FORMING HEAT-SHIELDING FILM ON INNER SURFACE OF COMBUSTION CHAMBER OF ENGINE BY MEANS OF ADDITION-CURING SILICONE RESIN, HEAT-SHIELDING FILM, AND HEAT SHIELDING METHOD FOR REDUCING OR PREVENTING HEAT DISSIPATION FROM COMBUSTION CHAMBER OF ENGINE TO OUTSIDE BY MEANS OF HEAT-SHIELDING FILM

(71) Applicants: MAZDA MOTOR CORPORATION, Hiroshima (JP); Shin-Etsu Chemical Co., Ltd., Tokyo (JP)

(72) Inventors: Kazuaki Yamamoto, Hiroshima (JP); Shinji Kadoshima, Hiroshima (JP); Hiroyuki Koga, Hiroshima (JP); Kazuyuki Negishi, Annaka (JP); Masahiko Minemura, Annaka (JP); Koichi Higuchi, Annaka (JP)

(73) Assignees: MAZDA MOTOR CORPORATION, Hiroshima (JP); Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 17/644,751

(22) Filed: Dec. 16, 2021

(65) Prior Publication Data
US 2022/0195136 A1 Jun. 23, 2022

(30) Foreign Application Priority Data
Dec. 17, 2020 (JP) .................. 2020-209566

(51) Int. Cl.
*C08J 9/00* (2006.01)
*C08K 3/016* (2018.01)
(Continued)

(52) U.S. Cl.
CPC ............ *C08J 9/0061* (2013.01); *C08G 77/12* (2013.01); *C08G 77/20* (2013.01); *C08G 77/70* (2013.01);
(Continued)

(58) Field of Classification Search
CPC .. C08J 9/0061; C08J 2383/04; C08J 2483/04; C08J 5/18; C08J 2383/07; C08G 77/12;
(Continued)

(56) References Cited

U.S. PATENT DOCUMENTS

2012/0034428 A1* 2/2012 Clarke ..................... B32B 5/26
442/140
2020/0392293 A1 12/2020 Negishi et al.

FOREIGN PATENT DOCUMENTS

CN 107915906 A * 4/2018 ............. C08L 23/16
CN 111315801 A 6/2020
(Continued)

*Primary Examiner* — Joseph J Dallo
(74) *Attorney, Agent, or Firm* — Studebaker & Brackett PC (57) ABSTRACT

In a heat-shielding film formed of addition-curing silicone resin containing organopolysiloxane, organopolysiloxane includes the combination of a plurality of units including at least a $R^1SiO_{3/2}$ unit (a T unit), a $R^2R^3SiO_{2/2}$ unit (a D unit), and a $R^4R^5R^6SiO_{1/2}$ unit (a M unit) (in each unit, $R^1$ to $R^6$ is aliphatic hydrocarbon or hydrogen), and the molar ratio of the T unit, the D unit, and the M unit among all structural units is T:33.3 mol % to 71.4 mol %, D:11.1 mol % to 42.9 mol %, and M:7.0 mol % to 42.9 mol %.

19 Claims, 5 Drawing Sheets

(51) Int. Cl.
    *C08G 77/12*     (2006.01)
    *C08G 77/20*     (2006.01)
    *C08G 77/00*     (2006.01)
    *B32B 7/12*     (2006.01)

(52) U.S. Cl.
    CPC ............... *C08K 3/016* (2018.01); *B32B 7/12* (2013.01); *C08J 2383/04* (2013.01); *C08J 2483/04* (2013.01)

(58) Field of Classification Search
    CPC ........ C08G 77/20; C08G 77/70; C08G 77/04; C08G 77/06; C08G 77/80; C08K 3/016; C08K 3/08; C08K 3/36; C08K 7/24; C08K 7/26; C08K 2003/0812; C08K 2003/0881; C08K 2003/2227; C08K 2003/2241; C08K 2003/2244; C08K 2201/011; B32B 7/12; C08L 83/04; C09D 183/04

See application file for complete search history.

(56) References Cited

FOREIGN PATENT DOCUMENTS

| EP | 622421 A2 | * | 11/1994 | ............... C08L 83/04 |
| JP | 2016-065155 A | | 4/2016 | |
| JP | 2017-155847 A | | 9/2017 | |
| WO | WO-9511282 A1 | * | 4/1995 | ........... C09D 183/04 |
| WO | WO-2009054995 A1 | * | 4/2009 | ............... B32B 5/26 |
| WO | WO-2009129783 A2 | * | 10/2009 | ............... C09D 1/00 |
| WO | WO-2011071117 A1 | * | 6/2011 | ............... C09D 4/00 |
| WO | WO-2012105538 A1 | * | 8/2012 | ................ F16J 9/00 |

\* cited by examiner

ADDITION-CURING SILICONE RESIN FOR PRODUCING HEAT-SHIELDING FILM, METHOD FOR FORMING HEAT-SHIELDING FILM ON INNER SURFACE OF COMBUSTION CHAMBER OF ENGINE BY MEANS OF ADDITION-CURING SILICONE RESIN, HEAT-SHIELDING FILM, AND HEAT SHIELDING METHOD FOR REDUCING OR PREVENTING HEAT DISSIPATION FROM COMBUSTION CHAMBER OF ENGINE TO OUTSIDE BY MEANS OF HEAT-SHIELDING FILM

CROSS-REFERENCE TO RELATED APPLICATION

This application claims priority to Japanese Patent Application No. 2020-209566 filed on Dec. 17, 2020, the entire disclosure of which is incorporated by reference herein.

BACKGROUND

Typically, a heat-shielding film has been sometimes utilized for enhancing an energy efficiency in industrial or customer equipment requiring energy supply. For example, Japanese Patent Application Laid-Open No. 2016/65155 (particularly, paragraphs 0009 and 0013 to 0015) describes that a heat insulating layer (a heat-shielding film) is provided on a top surface of a piston forming a combustion chamber of an engine.

The heat insulating layer of Japanese Patent Application Laid-Open No. 2016/65155 contains many hollow particles and a binder, and silicone resin as the binder contains a T unit and a D unit as basic structural units. In the heat insulating layer of Japanese Patent Application Laid-Open No. 2016/65155, a D unit is also contained as a basic structural unit of the silicone resin in addition to the T unit so that a thermal conductivity and volume specific heat can be reduced while heat resistance is improved.

However, in order for the silicone resin forming the heat insulating layer to have both rigidity and flexibility, it has been demanded that the proportion of each basic structural unit in the entirety of the silicone resin is more optimized.

Particularly, in a case where the heat insulating layer (the heat-shielding film) is used in a severe place such as the combustion chamber of the engine in which explosion occurs under high temperature and pressure as in Japanese Patent Application Laid-Open No. 2016/65155, a high heat resistance is required for the heat-shielding film, and a demand level is extremely high, such as the necessity of reliably reducing or preventing, e.g., cracks on a heat insulating layer surface to avoid disturbance of the flow of combustion gas. For these reasons, development of a high-performance heat-shielding film suitable for the above-described use has been demanded.

SUMMARY

In view of the foregoing, it is an object of the present invention is to provide addition-curing silicone resin particularly suitable for production of a heat-shielding film having a high heat resistance and being capable of reliably reducing or preventing, e.g., occurrence of cracks.

According to a first aspect of the present invention, there is provided addition-curing silicone resin for producing a heat-shielding film, the addition-curing silicone resin containing organopolysiloxane, organopolysiloxane including the combination of a plurality of units including at least a $R^1SiO_{3/2}$ unit (a T unit), a $R^2R^3SiO_{2/2}$ unit (a D unit), and a $R^4R^5R^6SiO_{1/2}$ unit (a M unit) (in each unit, $R^1$ to $R^6$ is aliphatic hydrocarbon or hydrogen), and the molar ratio of the T unit, the D unit, and the M unit among all structural units being T:33.3 mol % to 71.4 mol %, D:7.0 mol % to 42.9 mol %, and M:11.1 mol % to 42.9 mol %.

According to this aspect, there is provided the addition-curing silicone resin particularly suitable for producing the heat-shielding film having a high heat resistance and being capable of reliably reducing or preventing, e.g., occurrence of cracks.

According to a second aspect of the present invention, in the addition-curing silicone resin for producing the heat-shielding film according to the first aspect, the molar ratio of the T unit, the D unit, and the M unit among all structural units of organopolysiloxane is T:40 mol % to 62.9 mol %, D:17.8 mol % to 34.3 mol %, and M:15.0 mol % to 34.3 mol %.

According to this aspect, the molar ratio of the T unit, the D unit, and the M unit of the addition-curing silicone resin particularly suitable for producing the heat-shielding film can be further specified.

In a third aspect of the present invention, in the addition-curing silicone resin for producing the heat-shielding film according to the first or second aspect, the D unit or the M unit among all structural units of organopolysiloxane contains an addition-curing reaction group as an atom group reacting in addition-curing reaction.

According to this aspect, in a three-dimensional network structure after addition-curing, an excessive increase in a crosslinking density can be reduced or prevented, and occurrence of cracks on the heat-shielding film can be reduced or prevented.

According to a fourth aspect of the present invention, in the addition-curing silicone resin for producing the heat-shielding film according to the third aspect, the D unit or the M unit includes a first type in which a vinyl group as the addition-curing reaction group is bound directly to a silicon atom and a second type in which a hydrogen atom reacting with the vinyl group is bound directly to a silicon element, and the blending ratio (First Type:Second Type) of the first type and the second type is 1:1.

According to this aspect, the remaining unreacted vinyl group or hydrogen atom after the addition-curing reaction can be reduced or prevented.

According to a fifth aspect of the present invention, in the addition-curing silicone resin for producing the heat-shielding film according to the fourth aspect, any of $R^1$ to $R^6$ other than the vinyl group and the hydrogen atom is a methyl group bound directly to a silicon atom.

According to this aspect, the heat resistance of the heat-shielding film can be improved.

According to a sixth aspect of the present invention, there is provided the method for forming a heat-shielding film on an inner surface of a combustion chamber of an engine by means of the addition-curing silicone resin for producing the heat-shielding film according to any one of the first to fifth aspects.

According to this aspect, even when the heat-shielding film is used in a severe place such as the combustion chamber of the engine in which explosion occurs under high temperature and pressure, the heat resistance of the heat-shielding film is maintained, and the flow of combustion gas is not disturbed due to no occurrence of cracks.

According to a seventh aspect of the present invention, there is provided a heat-shielding film formed of addition-curing silicone resin containing organopolysiloxane, organopolysiloxane including the combination of a plurality of units including at least a $R^1SiO_{3/2}$ unit (a T unit), a $R^2R^3SiO_{2/2}$ unit (a D unit), and a $R^4R^5R^6SiO_{1/2}$ unit (a M unit) (in each unit, $R^1$ to $R^6$ is aliphatic hydrocarbon or hydrogen) and the molar ratio of the T unit, the D unit, and the M unit among all structural units being T:33.3 mol % to 71.4 mol %, D:7.0 mol % to 42.9 mol %, and M:11.1 mol % to 42.9 mol %.

According to this aspect, there is provided the heat-shielding film having a high heat resistance and being capable of reliably reducing or preventing, e.g., occurrence of cracks.

According to an eighth aspect of the present invention, in the heat-shielding film according to the seventh aspect, the molar ratio of the T unit, the D unit, and the M unit among all structural units of organopolysiloxane is T:40 mol % to 62.9 mol %, D:17.8 mol % to 34.3 mol %, and M:15.0 mol % to 34.3 mol %.

According to this aspect, the molar ratio of the T unit, the D unit, and the M unit of the addition-curing silicone resin particularly suitable for producing the heat-shielding film can be further specified.

According to a ninth aspect of the present invention, in the heat-shielding film according to the seventh or eighth aspect, the D unit or the M unit among all structural units of organopolysiloxane contains an addition-curing reaction group as an atom group reacting in addition-curing reaction.

According to this aspect, in a three-dimensional network structure after addition-curing, an excessive increase in a crosslinking density can be reduced or prevented, and occurrence of cracks on the heat-shielding film can be reduced or prevented.

According to a tenth aspect of the present invention, in the heat-shielding film according to the ninth aspect, the D unit or the M unit includes a first type in which a vinyl group as the addition-curing reaction group is bound directly to a silicon atom and a second type in which a hydrogen atom reacting with the vinyl group is bound directly to a silicon element, and the blending ratio (First Type:Second Type) of the first type and the second type is 1:1.

According to this aspect, the remaining unreacted vinyl group or hydrogen atom after the addition-curing reaction can be reduced or prevented.

In an eleventh aspect of the present invention, in the heat-shielding film according to the tenth aspect, any of $R^1$ to $R^6$ other than the vinyl group and the hydrogen atom is a methyl group bound directly to a silicon atom.

According to this aspect, the heat resistance of the heat-shielding film can be improved.

According to a twelfth aspect of the present invention, the heat-shielding film according to any one of the seventh to eleventh aspects further contains hollow particles and nanoparticles, and the sum of the proportion of the hollow particles and the proportion of the nanoparticles in the total amount of the addition-curing silicone resin, the hollow particles, and the nanoparticles is equal to or greater than 37% by volume and equal to or smaller than 82% by volume.

With this configuration, only a sufficient amount of hollow particles and a sufficient amount of nanoparticles can be contained in the heat-shielding film while the function of a binder obtained by addition-curing of the addition-curing silicone resin is fulfilled.

According to a thirteenth aspect of the present invention, in the heat-shielding film according to any one of the seventh to the twelfth aspects, the thickness of the heat-shielding film is equal to or greater than 20 µm and equal to or smaller than 150 µm.

According to this aspect, the internal stress of the heat-shielding film can be reduced, and occurrence of cracks can be reduced or prevented.

In a fourteenth aspect of the present invention, in the heat-shielding film according to the twelfth or thirteenth aspect, the median diameter of the hollow particles is 30 µm or less.

According to this aspect, heat shielding performance required for the heat-shielding film is easily fulfilled.

According to a fifteenth aspect of the present invention, in the heat-shielding film according to the twelfth, thirteenth, or fourteenth aspect, the porosity of the hollow particle is equal to or greater than 60% by volume, and more preferably equal to or greater than 70% by volume.

According to this aspect, the heat shielding performance required for the heat-shielding film is easily fulfilled.

According to a sixteenth aspect of the present invention, in the heat-shielding film according to any one of the twelfth to fifteenth aspects, the proportion of the hollow particles in the total amount of the addition-curing silicone resin, the hollow particles, and the nanoparticles is equal to or greater than 30% by volume and equal to or smaller than 60% by volume, and more preferably equal to or greater than 40% by volume and equal to or smaller than 55% by volume.

According to this aspect, only a necessary sufficient amount of hollow particles can be contained in the heat-shielding film.

According to a seventeenth aspect of the present invention, in the heat-shielding film according to any one of the seventh to sixteenth aspects, the addition-curing silicone resin further contains toluene as a solvent and is used as a resin solution.

According to this aspect, organopolysiloxane can be favorably dissolved in the resin solution.

According to an eighteenth aspect of the present invention, in the heat-shielding film according to the seventeenth aspect, the proportion of toluene in the resin solution is equal to or greater than 30% by volume and equal to or smaller than 70% by volume.

According to this aspect, a proper HSP distance between the resin solution and the nanoparticle can be easily held.

According to a nineteenth aspect of the present invention, there is provided a heat shielding method for reducing or preventing heat dissipation from a combustion chamber of an engine to the outside by means of the heat-shielding film according to any one of the seventh to eighteenth aspects.

According to this aspect, even in a severe place such as a combustion chamber of an engine in which explosion occurs under high temperature and high pressure, the heat resistance of the heat-shielding film is maintained, and the flow of combustion gas is not disturbed due to no occurrence of cracks on the heat-shielding film.

DETAILED DESCRIPTION

Hereinafter, an embodiment of the present invention will be described with reference to the drawings. Note that the following description of a preferred embodiment is merely an example in nature and is not intended to limit the present invention.

<1. Embodiment>

The heat-shielding film is formed in such a manner that addition-curing silicone resin is formed in a film shape according to a heat shielding target. Hereinafter, the preferred embodiment will be described, but is not intended to limit the present invention.

<1-1. Application Example of Heat-Shielding Film>

Figure 1:
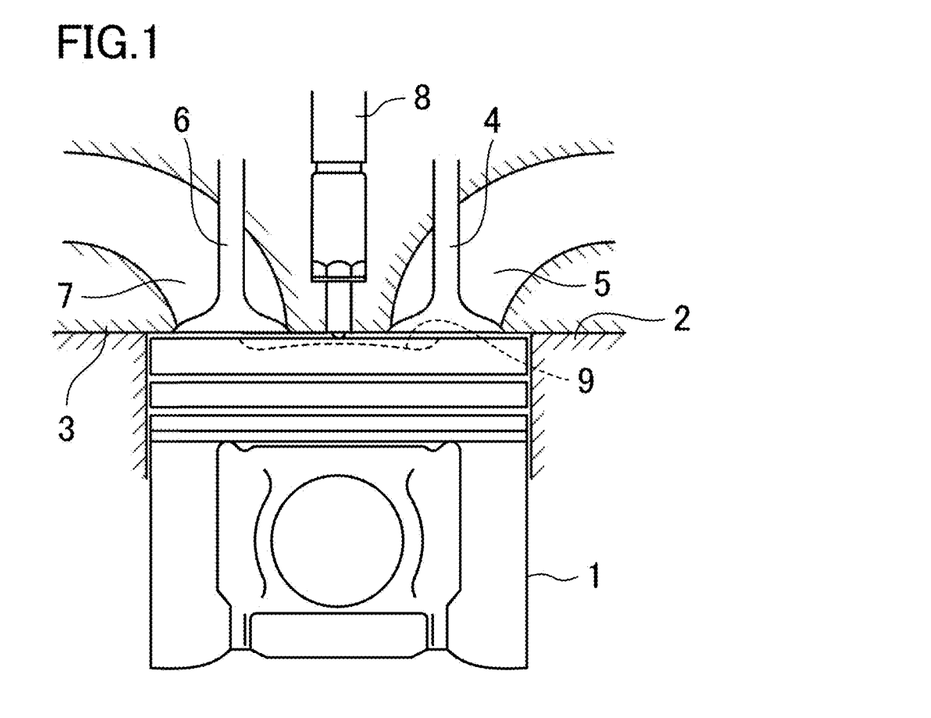
FIG. 1 is a vertical sectional view showing a configuration in the vicinity of a combustion chamber of an engine as an application example of the present invention.

Hereinafter, a schematic configuration of a diesel engine to which the heat-shielding film 11 according to the present invention is applied will be described with reference to FIG. 1. FIG. 1 is a vertical sectional view showing a configuration near a combustion chamber of the diesel engine. This diesel engine includes a piston 1 made of aluminum alloy, a cylinder block 2, a cylinder head 3, an intake valve 4, an intake port 5, an exhaust valve 6, an exhaust port 7, and a fuel injection valve 8. The piston 1 reciprocates up and down in a cylinder of the cylinder block 2. The intake port 5 and the exhaust port 7 are formed at the cylinder head 3, and the intake valve 4 is openably provided at the intake port 5 and the exhaust valve 6 is openably provided at the exhaust port 7. The combustion chamber of the diesel engine is formed by a top surface of the piston 1, the cylinder block 2, the cylinder head 3, and inner surfaces (surfaces facing the combustion chamber) of umbrella portions of the intake valve 4 and the exhaust valve 6. A cavity 9 is formed on the top surface of the piston 1.

In the above-described diesel engine, when liquid fuel is injected into the combustion chamber from the fuel injection valve 8, the piston 1 reciprocates in the cylinder by propulsion obtained by explosion occurred in the combustion chamber, reciprocation motion of the piston 1 is converted into rotation motion of a crankshaft (not shown) via a rod (not shown), and power is obtained accordingly.

Figure 2:
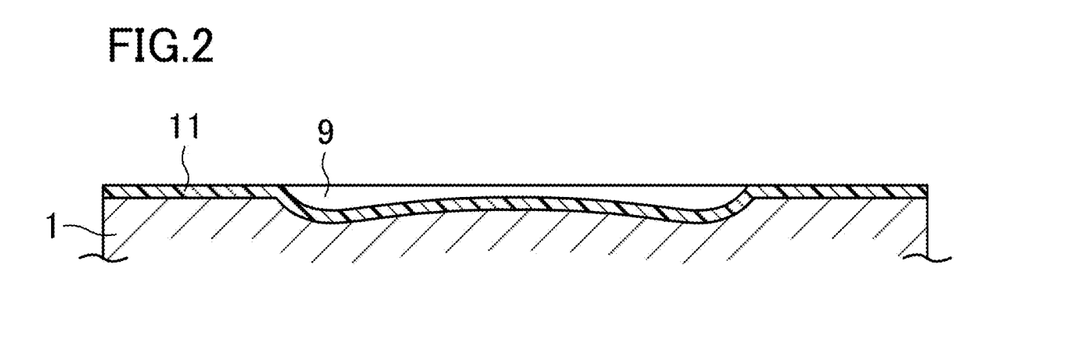
FIG. 2 is a vertical sectional view showing the configuration of a heat-shielding film provided on a top surface of a piston of the engine.

FIG. 2 is a vertical sectional view showing the configuration of the heat-shielding film 11 provided on the top surface of the piston 1 of the diesel engine. As shown in FIG. 2, the heat-shielding film 11 is formed on the top surface of the piston 1.

<1-2. Schematic Configuration of Heat-Shielding Film>

Figure 3:
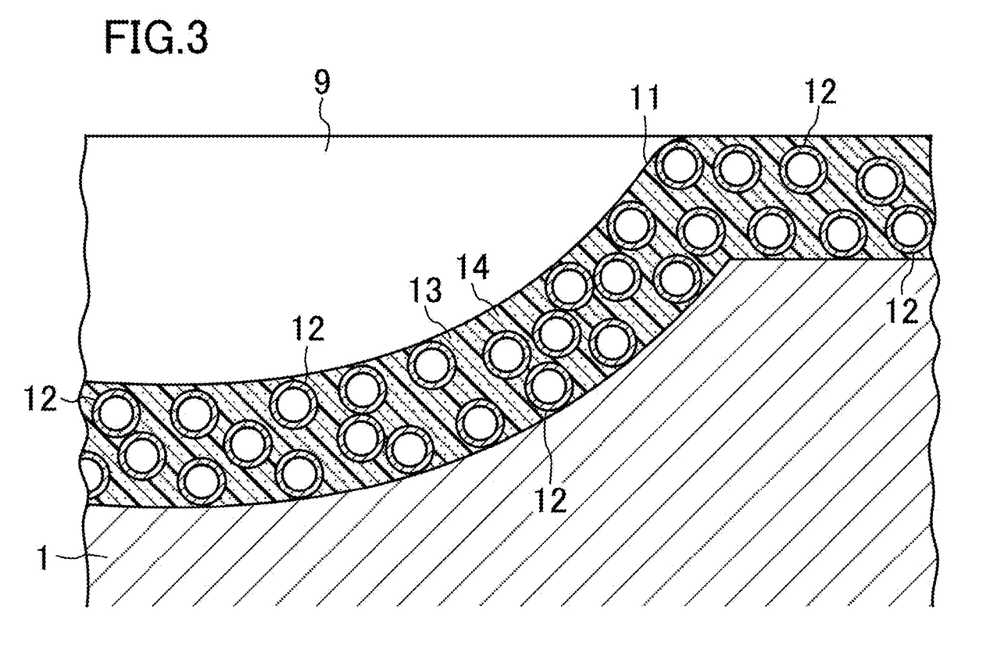
FIG. 3 is an enlarged sectional view of the heat-shielding film.

Hereinafter, a schematic configuration of the heat-shielding film 11 will be described with reference to FIG. 3. FIG. 3 is an enlarged sectional view of the heat-shielding film 11. The heat-shielding film 11 includes many hollow particles 12, a silicone resin binder 13, and many nanoparticles 14.

The thickness of the heat-shielding film 11 is, for example, equal to or greater than 20 μm and equal to or smaller than 150 μm, and more preferably equal to or greater than 40 μm and equal to or smaller than 100 μm. Note that the numerical range of the thickness of the heat-shielding film 11 is merely a preferred range in a case where a heat-shielding film is provided on an inner surface of a combustion chamber of a general diesel engine and may vary according to, e.g., the size of the engine. In a case where a heat-shielding film is provided at, e.g., industrial/consumer equipment to be used in a severe situation other than a combustion chamber of an engine, the numerical range of the thickness of the heat-shielding film can be changed to a smaller or greater range than the above-described numerical range, as necessary.

<1-3. Configuration of Hollow Particle>

Hereinafter, the configuration of the hollow particle 12 will be described. As shown in FIG. 3, the hollow particles 12 are substantially uniformly dispersed across the entirety of the heat-shielding film 11. The hollow particle 12 is a particle made of inorganic oxide. Specifically, the hollow particle 12 may be a ceramic-based hollow particle containing a silicon-based oxide component (e.g., silica) or an aluminum-based oxide component (e.g., alumina), such as a glass balloon, a glass bubble, a fly ash balloon, a shirasu balloon, a silica balloon, or an aluminosilicate balloon.

The hollow particle 12 has a particle size of μm order smaller than the thickness of the heat-shielding film 11. The median diameter of the hollow particle 12, i.e., the median value of the particle sizes of all hollow particles 12, is 30 μm or less, and more preferably 10 μm or less, for example. The porosity of the hollow particle 12 is, for example, 60% by volume or more, and more preferably 70% by volume or more.

The proportion of the hollow particles 12 in the total amount of many hollow particles 12, the silicone resin binder 13, and many nanoparticles 14 is, for example, equal to or greater than 30% by volume and equal to or smaller than 60% by volume, and more preferably equal to or greater than 40% by volume and equal to or smaller than 55% by volume. The above-described proportion of the hollow particles 12 can be adjusted as necessary according to heat shielding performance (level) required for the heat-shielding film 11.

<1-4. Configuration of Nanoparticle>

Hereinafter, the configuration of the nanoparticle 14 will be described. In FIG. 3, the nanoparticles 14 are indicated by dots. As shown in FIG. 3, the nanoparticles 14 are substantially uniformly dispersed across the entirety of the silicone resin binder 13. The nanoparticle 14 is a hollow or solid particle. The nanoparticle 14 is a particle made of an inorganic compound or metal. Specifically, the nanoparticle 14 may be made of an inorganic compound such as zirconia, alumina, silica, or titania, or may be made of metal such as titanium, zirconium, or aluminum.

The nanoparticle 14 has a particle size of nm order significantly smaller than the thickness of the heat-shielding film 11. The average particle size of the nanoparticles 14, i.e., the average value of the particle sizes of all nanoparticles 14, is preferably equal to or smaller than 500 nm, more preferably equal to or greater than 1 nm and equal to or smaller than 200 nm, and much more preferably equal to or greater than 1 nm and equal to or smaller than 120 nm.

The sum of the proportion of the hollow particles 12 and the proportion of the nanoparticles 14 in the total amount of many hollow particles 12, the silicone resin binder 13, and many nanoparticles 14 is preferably equal to or greater than 37% by volume and equal to or smaller than 82% by volume.

<1-5. Configuration of Silicone Resin Binder>

The silicone resin binder 13 is obtained in such a manner that a thermosetting silicone resin solution is baked and solidified by a later-described method. The silicone resin binder 13 holds the hollow particles 12 in the vicinity of the top surface of the piston 1, and fills a gap among the hollow particles 12 to form the matrix of the heat-shielding film 11. The silicone resin binder 13 contains addition-cured organopolysiloxane. That is, the thermosetting silicone resin solution contains organopolysiloxane before addition-curing reaction. Note that a detailed configuration of the thermosetting silicone resin solution will be described later.

<1-6. Detailed Configuration of Thermosetting Silicone Resin Solution>

Hereinafter, the configuration of the thermosetting silicone resin solution (hereinafter, simply referred to as a "silicone resin solution") will be described in detail.

The silicone resin solution contains organopolysiloxane and a solvent.

The solvent is for adjusting an HSP distance between the silicone resin solution and the nanoparticle as necessary (e.g., adjusting to equal to or greater than $8.5$ $MPa^{0.5}$) when the silicone resin solution and the nanoparticles are mixed later. As the solvent, various publicly-known solvents can be adopted as long as the above-described purpose can be achieved, and for example, toluene can be preferably used. The proportion of toluene in the total amount of the silicone resin solution can be, for example, equal to or greater than 30% by volume and equal to or smaller than 70% by volume.

One molecule of organopolysiloxane has, as basic structural units (siloxane units), a unit (hereinafter referred to as a "T unit") represented by $R^1SiO_{3/2}$, a unit (hereinafter referred to as a "D unit") represented by $R^2R^3SiO_{2/2}$, and a unit (hereinafter referred to as a "M unit") represented by $R^4R^5R^6SiO_{1/2}$. Note that in each unit, $R^1$ to $R^6$ are aliphatic hydrocarbon or hydrogen. Specific configurations of $R^1$ to $R^6$ will be described later. In one molecule of organopolysiloxane of the present embodiment, the T unit, the D unit, and the M unit are combined such that the molar ratio thereof is T:33.3 mol % to 71.4 mol %, D:7.0 mol % to 42.9 mol %, and M:11.1 mol % to 42.9 mol %. More preferably, in one molecule of organopolysiloxane of the present embodiment, the T unit, the D unit, and the M unit are combined such that the molar ratio thereof is T:40 mol % to 62.9 mol %, D:17.8 mol % to 34.3 mol %, and M:15.0 mol % to 34.3 mol %.

In general, as the proportion of the T unit contained in one molecule of organopolysiloxane increases, the heat resistance of organopolysiloxane is improved and the rigidity of a product (in the present embodiment, the heat-shielding film 11) after baking increases. This is because the greater the proportion of the T unit is, the more cross-linked structures of siloxane bonds (Si—O—Si) are contained. When bond energy contains a relatively large number of siloxane bonds, the heat resistance is high.

The inventors of the present application have found that when the proportion of the M unit contained in one molecule of organopolysiloxane is too small, storage stability is deteriorated. On the other hand, the inventors of the present application have also found that when the proportion of the M unit is too great, many organic groups weak against heat are contained and the heat resistance is degraded accordingly.

In the present embodiment, the molar ratio of the T unit, the D unit, and the M unit contained in one molecule of organopolysiloxane is set within the above-described numerical range so that a material having both rigidity and flexibility which are generally in a trade-off relationship can be achieved.

Note that in addition to the T unit, the D unit, and the M unit, a unit (hereinafter, referred to as a "Q unit") represented by $SiO_{4/2}$ may be also contained in part of organopolysiloxane of the present embodiment.

The T unit contained in organopolysiloxane in the present embodiment is represented by Chemical Formula (1) below. As in Chemical Formula (1), R1 is a methyl group bound directly to a silicon atom.

[Chemical Formula 1]

(1)

The D units contained in organopolysiloxane in the present embodiment is represented by Chemical Formulae (2) and (3) below. In the D unit contained in organopolysiloxane of the present embodiment, a first type represented by Chemical Formula (2) and a second type represented by Chemical Formula (3) are mixed at a blending ratio of 1:1 (First Type:Second Type). In the first type, R2 is a methyl group bound directly to a silicon atom as in Chemical Formula (2). Moreover, in the first type, R3 is a vinyl group bound to the silicon atom as in Chemical Formula (2). In the second type, R2 is a methyl group bound directly to a silicon atom as in Chemical Formula (3). Moreover, in the second type, R3 is a hydrogen atom bound directly to the silicon atom as in Chemical Formula (3).

[Chemical Formula 2]

(2)

[Chemical Formula 3]

(3)

Of the first type of the D unit, the vinyl group (R3) corresponds to an "addition-curing reaction group" according to the present embodiment. Of the second type of the D unit, the hydrogen atom (R3) also corresponds to an "addition-curing reaction group" according to the present embodiment.

The M unit contained in organopolysiloxane in the present embodiment is represented by Chemical Formula (4) below. As in Chemical Formula (4), R4, R5, and R6 are methyl groups bound directly to a silicon atom.

[Chemical Formula 4]

(4)

In general, it has been known that an organic group (particularly, one having a great carbon number) has a relatively small bond energy between carbon atoms, and therefore, is weak against heat. Typically, organopolysiloxane having a structure in which an organic group (e.g., a phenyl group) having a great carbon number is contained in a siloxane unit has been known, but, in a case where a heat-shielding film is manufactured using such organopolysiloxane, such a heat-shielding film cannot withstand use in a severe place such as a combustion chamber of an engine in which explosion occurs under high temperature and pressure. On this point, in organopolysiloxane of the present embodiment, all organic groups of atom groups contained in the siloxane units other than the vinyl group of the D unit (the first type) are methyl groups having the minimum carbon number. Thus, the heat-shielding film manufactured using organopolysiloxane of the present embodiment has a high heat resistance and is particularly suitable for use in a severe place such as the combustion chamber of the engine.

Organopolysiloxane as described above can be manufactured by a publicly-known method. For example, organopolysiloxane can be obtained in such a manner that organochlorosilane and/or organoalkoxysilane capable of forming the above-described siloxane units by hydrolysis condensation reaction or a partially-hydrolyzed condensate thereof and excess water for hydrolyzing all hydrolyzable groups (e.g., a chloro group and an alkoxy group) are subjected to the hydrolysis condensation reaction under an acidic condition in an organic solvent capable of dissolving a raw material silane compound and generated organopolysiloxane. Organopolysiloxane having a desired weight average molecular weight can be obtained by adjustment of a monomer mixing ratio, reaction temperature and time, and the blending amounts of water and the organic solvent. Before use, the unnecessary organic solvent is removed from organopolysiloxane manufactured as described above, and a precipitate is removed by filtration.

Organopolysiloxane from which the unnecessary organic solvent has been removed is mixed with the above-described solvent (e.g., toluene) to generate the silicone resin solution.

<1-7. Method for Manufacturing Heat-Shielding Film>

Hereinafter, the method for manufacturing the heat-shielding film 11 will be described. This manufacturing method includes a nanoparticle dispersion preparation step, the coating step of coating a base material with nanoparticle dispersion, and the baking step of baking and solidifying the layer of the coated nanoparticle dispersion.

<1-7-1. Preparation Step>

First, nanoparticles are added to a silicone resin solution generated as described above and the resultant is stirred, and in this manner, a nanoparticle dispersion is prepared. The blending amount of the nanoparticles may be, for example, equal to or greater than 10% by volume and equal to or smaller than 55% by volume in terms of the proportion in the total amount of the silicone resin solution and the nanoparticles.

A nanoparticle dispersion containing hollow particles may be prepared in such a manner that the nanoparticles are added to and stirred with the silicone resin solution and the hollow particles are further added to and stirred with the resultant. The blending amount of the hollow particles can be adjusted as necessary according to the required heat shielding performance. For example, the blending amount of the hollow particles may be equal to or greater than 30% by volume and equal to or smaller than 60% by volume.

The obtained nanoparticle dispersion can be stored until, e.g., the heat-shielding film 11 is manufactured. As described above, since the HSP distance between the nanoparticle and the silicone resin solution is adjusted to a proper distance, a nanoparticle dispersion state in the dispersion is maintained even during storage.

<1-7-2. Coating Step>

A coating layer is formed in such a manner that a base material (in the case of the present embodiment, the piston) is coated with the mixture of the nanoparticle dispersion and the hollow particles in the case of the nanoparticle dispersion containing no hollow particles, and is formed in such a manner that the base material is directly coated with the nanoparticle dispersion in the case of the nanoparticle dispersion to which the hollow particles have been added in advance. Such coating can be performed using, e.g., a spray, but is not limited to above and coating may be performed using a brush or a spatula. At the coating step, the viscosity of the nanoparticle dispersion may be adjusted to a viscosity suitable for coating in such a manner that an appropriate solvent is additionally added.

<1-7-3. Baking Step>

The coating layer on the base material is dried and baked to form a heat-shielding film. That is, addition-curing reaction groups contained in a D unit of the silicone resin solution react due to baking. Specifically, a vinyl group contained in a first type of the D unit and a hydrogen atom contained in a second type of the D unit are bound to each other by addition polymerization reaction, and silicone resin is cured accordingly. In this manner, a heat-shielding film containing the hollow particles and the nanoparticles is obtained. Baking can be performed in such a manner that the coating layer is heated at a temperature of about 100° C. to 200° C. for several minutes to several hours, for example.

EXAMPLES

Hereinafter, the present invention will be specifically described with reference to preparation examples, examples, and comparative examples, but is not limited to the following examples.

Note that the value of a weight average molecular weight (Mw) is, in description below, a standard polystyrene equivalent value measured using tetrahydrofuran as a developing solvent by means of gel permeation chromatography (GPC, Product Name: HLC-8320GPC EccSEC manufactured by Tosoh Corporation).

The viscosity of silicone oligomer is a value measured at 25° C. by means of a Cannon-Fenske viscometer. The viscosity of polysiloxane is a value measured at 25° C. by means of a single cylindrical rotary viscometer in accordance with JIS Z 8803 9.2.

The composition of silicone resin was calculated from the results of $^1$H-NMR measurement (Apparatus Name: ULTRA SHIELD 400 Plus manufactured by Bruker) and $^{29}$Si-NMR NMR measurement (Apparatus Name: JNM-ECX5002 manufactured by JEOL).

Each abbreviation represents the following siloxane unit: Q:$SiO_{4/2}$, $T^{Me}$:$MeSiO_{3/2}$, $T^H$: $HSiO_{3/2}$, $T^{Vi}$; $ViSiO_{3/2}$, $T^{Ph}$: $PhSiO_{3/2}$, $D^H$:$MeHSiO_{2/2}$, $D^{Vi}$:$MeViSiO_{2/2}$, $M^H$:$Me_2$ $HSiO_{1/2}$, $M^{Vi}$:$Me_2ViSiO_{1/2}$, M:$Me_3SiO_{1/2}$ (where Me represents a methyl group, Vi represents a vinyl group, and a Ph represents phenyl group).

<2. First Experimental Example>
[Synthesis of Silicone Oligomer]
[Synthesis Example 1]

After a methyltrimethoxysilane of 4,087 g had been injected into a glass flask equipped with a stirring apparatus, a thermometer, a cooling tube, and a dripping apparatus, a 1 N hydrochloric acid of 486 g was dripped over one hour during stirring, followed by aging at 67° C. for two hours. The obtained liquid was neutralized with a propylene oxide of 29 g and a volatile component and a solvent were evaporated out, and in this manner, silicone oligomer (1A) was obtained. The obtained silicone oligomer (1A) had a Mw of 1,700 and a viscosity of 25 mm²/s.

[Synthesis of Organopolysiloxane]

<2-1. Synthesis of Organopolysiloxane-1 According to Experimental Example of Present Invention>

A silicone oligomer (1A) of 445 g, a vinylmethyldimethoxysilane of 165 g, a methyldimethoxysilane of 133 g, a hexamethyldisiloxane of 202 g, and a toluene of 780 g were charged into a glass flask equipped with a stirring apparatus, a thermometer, a cooling tube, and a dripping apparatus such that a $T^{Me}$ unit is 50 mol %, a $D^{Vi}$ unit is 12.5 mol %, a $D^H$ unit is 12.5 mol %, and a M unit is 25 mol % and a methane sulfonic acid of 10 g was injected during stirring, and thereafter, a water of 105 g was further dripped over one hour and the resultant was aged at 67° C. for two hours and was further aged within a temperature range of 80° C. to 90° C. for three hours. The obtained liquid was washed with water until the liquidity of the extracted water become neutral, and thereafter, the solvent was evaporated out to obtain a product.

Organopolysiloxane obtained had a viscosity of 1,000 mPa·s, and from the results of the NMR measurement, contained a $T^{Me}$ unit of 50 mol %, a $D^H$ unit of 12.5 mol %, a $D^{Vi}$ unit of 12.5 mol %, and a M unit of 25 mol %. Moreover, organopolysiloxane had a weight average molecular weight of 30,000. Thus, the blending ratio of T Unit:D Unit:M Unit in organopolysiloxane according to the example of the present invention was 2:1:1.

In addition, from the results of the NMR measurement, it was confirmed that hydrocarbon groups connected to a silicon atom of each unit (the T unit, the D unit, and the M unit) are a vinyl group and a methyl group.

<2-2. Synthesis of Organopolysiloxane-2 According to Comparative Example>

A silicone oligomer (1A) of 427 g, a trimethoxysilane of 122 g, a vinyltrimethoxysilane of 148 g, a tetramethyldisiloxane of 202 g, and a toluene of 638 g were charged into a glass flask equipped with a stirring apparatus, a thermometer, a cooling tube, and a dripping apparatus such that the $T^{Me}$ unit is 50 mol %, the $T^H$ unit is 10 mol %, the $T^{Vi}$ unit is 10 mol %, and the $M^H$ unit is 30 mol % and a methane sulfonic acid of 10 g was injected during stirring, and thereafter, a water of 100 g was further dripped over one hour and the resultant was aged at 67° C. for two hours and was further aged within a temperature range of 80° C. to 90° C. for three hours. The obtained liquid was washed with water until the liquidity of the extracted water become neutral, and thereafter, the solvent was evaporated out to obtain a product.

Organopolysiloxane obtained had a viscosity of 25,000 mPa·s, and from the results of the NMR measurement, contained a T unit of 50 mol %, a $T^H$ unit of 10 mol %, a $T^{Vi}$ unit of 10 mol %, and a $M^H$ unit of 30 mol %. Moreover, organopolysiloxane had a weight average molecular weight of 40,000.

Thus, the blending ratio of T Unit:D Unit:M Unit in Organopolysiloxane-2 according to the comparative example was 7:0:3.

In addition, from the results of the NMR measurement, it was confirmed that hydrocarbon groups connected to a silicon atom of each unit (the T unit, the D unit, and the M unit) are a vinyl group and a methyl group.

<2-3. Experiment>

Each of Organopolysiloxane-1 and Organopolysiloxane-2 was applied to a flat base material made of aluminum to a thickness of 50 μm. The resultant was heated at 200° C. for two hours in an oven. Note that through previous preliminary experiment, the inventors et al. have found that addition-curing reaction in organopolysiloxane is completed about 100% when organopolysiloxane is heated at 200° C. for 30 minutes or more.

<2-4. Experimental Results>

Figure 4A:
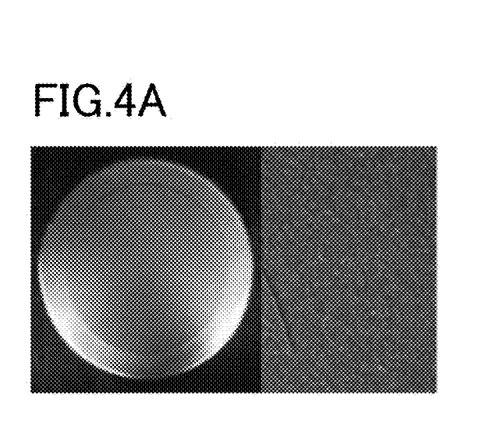
FIG. 4A is a photograph of a coated surface in an example of a first experimental example on the left side, and shows an enlarged view thereof on the right side.
Figure 4B:
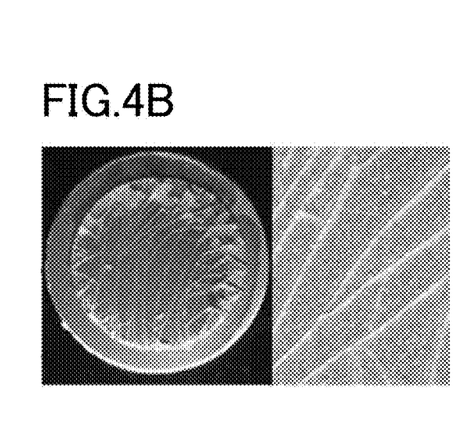
FIG. 4B is a photograph of a coated surface in a comparative example of the first experimental example on the left side, and shows an enlarged view thereof on the right side.

After having been heated at 200° C. for two hours, the base material was observed. As a result, as shown in FIG. 4B, it was observed that many cracks are caused on a coated surface of the base material coated with Organopolysiloxane-2. On the other hand, as shown in FIG. 4A, no cracks were observed at a coated surface of the base material coated with Organopolysiloxane-1.

Note that for the base material coated with Organopolysiloxane-1, the elasticity modulus (E) of the coated surface, the coefficient (ac) of linear expansion of the coated surface, and the glass transition temperature (Tg) of the coated surface were each obtained by a nanoindentation method, a TMA method, and a DMA method. Moreover, the coefficient (am) of linear expansion of the base material was obtained by a publicly-known method. In addition, a temperature (Tr) in a laboratory was measured with a thermometer. Using these values, the internal stress (P) of the coated surface of the base material coated with Organopolysiloxane-1 was about 11 MPa according to Expression (1) below.

$$P = E(ac-am)(Tg-Tr) \quad (1)$$

Figure 5:
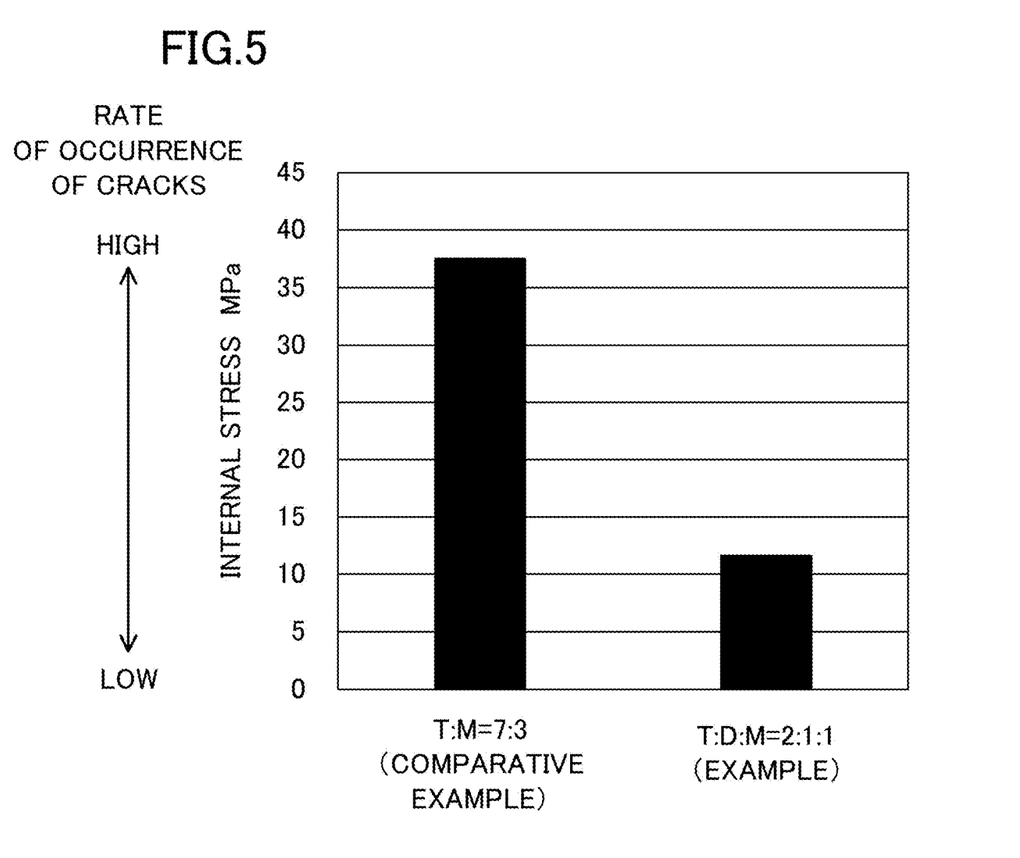
FIG. 5 is a bar graph showing the internal stress of the coated surface in each of the example and the comparative example of the first experimental example.

According to a similar manner, the internal stress (P) of the coated surface of the base material coated with Organopolysiloxane-2 was about 38 MPa according to Expression (1) above. For comparison, bar graphs showing the results for Organopolysiloxane-1 and Organopolysiloxane-2 are shown next to each other in FIG. 5. Referring to FIGS. 4 and 5, it is assumed that the internal stress of the coated surface is significantly smaller in the example than in the comparative example, and therefore occurrence of cracks is significantly smaller in the example than in the comparative example.

<3. Second Experimental Example>

<3-1. Synthesis of Organopolysiloxane-3 according to Comparative Example 2>

A phenyltrimethoxysilane of 991 g, a methyldimethoxysilane of 133 g, a vinylmethyldimethoxysilane of 165 g, a hexamethyldisiloxane of 203 g, and a toluene of 1050 g were charged into a glass flask equipped with a stirring apparatus, a thermometer, a cooling tube, and a dripping apparatus such that a $T^{Ph}$ unit is 50 mol %, a $D^H$ unit is 12.5 mol %, a $D^{Vi}$ unit is 12.5 mol %, and a M unit is 25 mol % and a methane sulfonic acid of 15 g was injected during stirring, and thereafter, a water of 216 g was further dripped over one hour and the resultant was aged at 67° C. for two hours and was further aged within a temperature range of 80° C. to 90° C. for three hours. The obtained liquid was washed with water until the liquidity of the extracted water become neutral, and thereafter, the solvent was evaporated out to obtain a product.

Organopolysiloxane obtained had a viscosity of 1,000 mPa·s, and from the results of the NMR measurement, contained a $T^{Ph}$ unit of 50 mol %, a $D^H$ unit of 12.5 mol %, a $D^{Vi}$ unit of 12.5 mol %, and a M unit of 25 mol %. Thus, the blending ratio of T Unit:D Unit:M Unit in organopolysiloxane-3 according to Comparative Example 2 was 2:1:1. Organopolysiloxane had a weight average molecular weight of 2,000.

In addition, from the results of the NMR measurement, it was confirmed that hydrocarbon groups connected to a silicon atom of each unit (the T unit, the D unit, and the M unit) are a vinyl group, a methyl group, and a phenyl group.

That is, in organopolysiloxane according to Comparative Example 2, about 30% of $R^1$ to $R^6$ was a phenyl group having a relatively-great carbon number, and about the remaining half of $R^1$ to $R^6$ was an atom group (a hydrocarbon group) or a hydrogen atom having a smaller carbon number.

<3-3. Experiment>

For Organopolysiloxane-1 and Organopolysiloxane-3, thermogravimetric reduction in a film cured at 200° C. was evaluated by TG-DTA. Regarding evaluation conditions, the temperature was increased from 30° C. to 800° C. at 10° C./min.

<3-4. Experimental Results>

Figure 6:
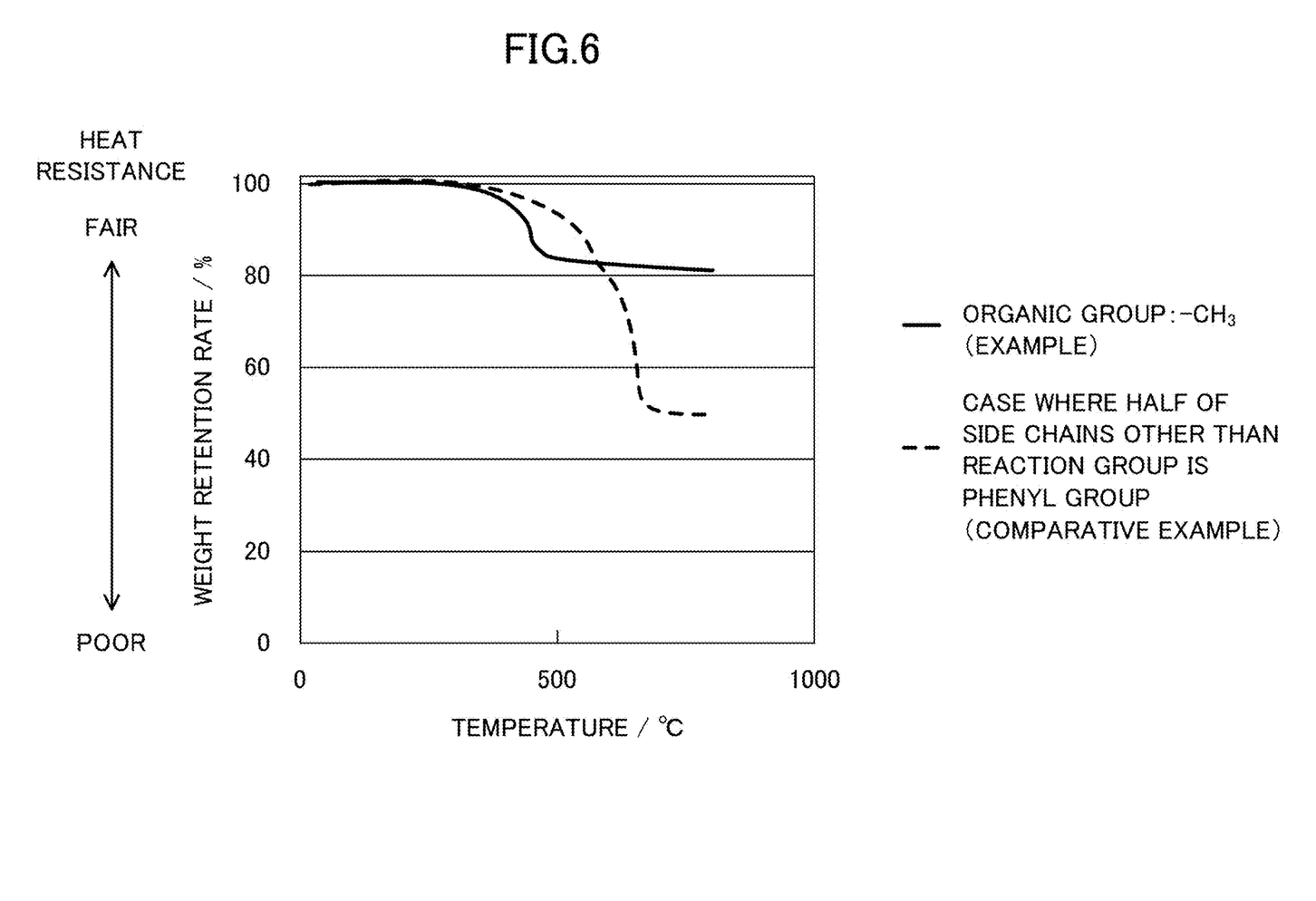
FIG. 6 is a graph showing a relationship between the temperature and weight retention rate of addition-curing silicone resin (solution) in each of an example and a comparative example of a second experimental example.

A chronological change in the weight retention rate (%) of Organopolysiloxane-1 when the weight of a film obtained by curing of Organopolysiloxane-1 at 200° C. is defined as 100 is shown in FIG. 6. Similarly, a chronological change in the weight retention rate (%) of Organopolysiloxane-3 when the weight of a film obtained by curing of Organopolysiloxane-3 at 200° C. is defined as 100 is shown in FIG. 6. As apparent from FIG. 6, in the comparative example, the weight retention rate starts significantly decreasing from around 500° C., and reaches about 50% at around 700° C. On the other hand, in the experimental example, although the weight retention rate temporarily decreases at a temperature before 500° C., the weight retention rate only gradually decreases thereafter and is maintained at 80% even after 700° C.

Accordingly, it is assumed that the smaller the carbon number in the atom groups of $R^1$ to $R^6$ is, the higher the heat resistance is exhibited.

<4. Summary>

As described above, organopolysiloxane includes the combination of a plurality of units including at least the $R^1SiO_{3/2}$ unit (the T unit), the $R^2R^3SiO_{2/2}$ unit (the D unit), and the $R^4R^5R^6SiO_{1/2}$ unit (the M unit) (in each unit, $R^1$ to $R^6$ are aliphatic hydrocarbon or hydrogen), and the molar ratio of the T unit, the D unit, and the M unit among all structural units is T:33.3 mol % to 71.4 mol %, D:11.1 mol % to 42.9 mol %, M:7.0 mol % to 42.9 mol %, and more preferably T:40 mol % to 62.9 mol %, D:17.8 mol % to 34.3 mol %, M:15.0 mol % to 34.3 mol %. With this configuration, the heat-shielding film 11 having a high heat resistance and capable of reliably reducing or preventing occurrence of cracks etc. is provided.

In the heat-shielding film 11, the D unit among all structural units of organopolysiloxane as described above includes the addition-curing reaction groups as the atom groups reacting in the addition-curing reaction. With this configuration, in a three-dimensional network structure after addition-curing, an excessive increase in a crosslinking density can be reduced or prevented, and occurrence of cracks in the heat-shielding film 11 can be reduced or prevented.

In addition, the D unit includes the first type in which the vinyl group as the addition-curing reaction group is bound directly to the silicon atom and the second type in which the hydrogen atom reacting with the vinyl group is bound directly to a silicon element, and the blending ratio (First Type:Second Type) between the first type and the second type is 1:1. With this configuration, the remaining unreacted vinyl group or hydrogen atom after the addition-curing reaction can be reduced or prevented.

In the heat-shielding film 11, any of $R^1$ to $R^6$ as described above other than the vinyl group and the hydrogen atom is the methyl group bound directly to the silicon atom. With this configuration, the heat resistance of the heat-shielding film can be improved.

The heat-shielding film 11 contains the hollow particles 12 and the nanoparticles 14, and the sum of the proportion of the hollow particles 12 and the proportion of the nanoparticles 14 in the total amount of the addition-curing silicone resin, the hollow particles 12, and the nanoparticles 14 is equal to or greater than 37 vol % and equal to or less than 82 vol %. With this configuration, a sufficient amount of hollow particles 12 and a sufficient amount of nanoparticles 14 can be contained in the heat-shielding film.

The thickness of the heat-shielding film 11 is equal to or greater than 25 μm and equal to or smaller than 100 μm. With this configuration, the internal stress of the heat-shielding film 11 can be decreased, and occurrence of cracks can be reduced or prevented.

The median diameter of the hollow particle is 30 μm or less. With this configuration, the heat shielding performance required for the heat-shielding film 11 can be easily satisfied.

Further, the porosity of the hollow particle is 60% by volume or more. With this configuration, the heat shielding performance required for the heat-shielding film 11 can be easily satisfied.

In the heat-shielding film 11, the proportion of the hollow particles 12 in the total amount of the addition-curing silicone resin, the hollow particles 12, and the nanoparticles 14 is equal to or greater than 30% by volume and equal to or smaller than 60% by volume. With this configuration, only a necessary sufficient amount of hollow particles 12 can be contained in the heat-shielding film 11.

The addition-curing silicone resin further contains toluene as the solvent, and is used as the resin solution. Thus, organopolysiloxane can be favorably dissolved in the resin solution.

In the heat-shielding film 11, the proportion of toluene in the resin solution is equal to or greater than 30% by volume and equal to or smaller than 70% by volume. With this configuration, an appropriate HSP distance between the resin solution and the nanoparticle 14 can be easily held.

<4. Variations>

The preferred embodiment and examples of the present invention have been described above. However, the present invention is not limited thereto, and various changes can be made to the embodiment and examples described above.

<4-1. First Variation>

In the above-described examples, all of the addition-curing reaction groups were bound to the D unit. However, the present invention is not limited thereto, and instead, some of the addition-curing reaction groups may be bound to the M unit.

<4-2. Second Variation>

In the above-described examples, all of $R^1$ to $R^6$ are the methyl groups having the minimum carbon number. Such a configuration is suitable for improving the heat resistance, but the present invention is not limited thereto. That is, in a case where a heat resistance condition is that the weight retention rate is maintained at equal to or greater than 60%, organic groups of about 30 mol % or less of all of $R^1$ to $R^6$ may be phenyl groups, for example.

What is claimed is:

1. Addition-curing silicone resin for producing a heat-shielding film, comprising: organopolysiloxane,
    the organopolysiloxane including a combination of a plurality of units including at least a $R^1SiO_{3/2}$ unit as a T unit, a $R^2R^3SiO_{2/2}$ unit as a D unit, and a $R^4R^5R^6SiO_{1/2}$ unit as a M unit, $R^1$ to $R^6$ being aliphatic hydrocarbon or hydrogen in each unit, and a molar ratio of the T unit, the D unit, and the M unit among all structural units being T:33.3 mol % to 71.4 mol %, D:7.0 mol % to 42.9 mol %, and M:11.1 mol % to 42.9 mol %.

2. The addition-curing silicone resin of claim 1, wherein the molar ratio of the T unit, the D unit, and the M unit among all structural units of the organopolysiloxane is T:40 mol % to 62.9 mol %, D:17.8 mol % to 34.3 mol %, and M:15.0 mol % to 34.3 mol %.

3. The addition-curing silicone resin of claim 1, wherein the D unit or the M unit among all structural units of the organopolysiloxane contains an addition-curing reaction group as an atom group reacting in addition-curing reaction.

4. The addition-curing silicone resin of claim 3, wherein the D unit or the M unit includes
    a first type in which a vinyl group as the addition-curing reaction group is bound directly to a silicon atom, and
    a second type in which a hydrogen atom reacting with the vinyl group is bound directly to a silicon element, and
    a blending ratio of the first type and the second type as First Type:Second Type is 1:1.

5. The addition-curing silicone resin of claim 4, wherein any of $R^1$ to $R^6$ other than the vinyl group and the hydrogen atom is a methyl group bound directly to a silicon atom.

6. A method for forming a heat-shielding film on an inner surface of a combustion chamber of an engine by means of the addition-curing silicone resin of claim 1.

7. A heat-shielding film formed of addition-curing silicone resin containing organopolysiloxane,
    the organopolysiloxane including a combination of a plurality of units including at least a $R^1SiO_{3/2}$ unit as a T unit, a $R^2R^3SiO_{2/2}$ unit as a D unit, and a $R^4R^5R^6SiO_{1/2}$ unit as a M unit, $R^1$ to $R^6$ being aliphatic hydrocarbon or hydrogen in each unit, and a molar ratio of the T unit, the D unit, and the M unit among all structural units being T:33.3 mol % to 71.4 mol %, D:7.0 mol % to 42.9 mol %, and M:11.1 mol % to 42.9 mol %.

8. The heat-shielding film of claim 7, wherein the molar ratio of the T unit, the D unit, and the M unit among all structural units of the organopolysiloxane is T:40 mol % to 62.9 mol %, D:17.8 mol % to 34.3 mol %, and M:15.0 mol % to 34.3 mol %.

9. The heat-shielding film of claim 7, wherein the D unit or the M unit among all structural units of the organopolysiloxane contains an addition-curing reaction group as an atom group reacting in addition-curing reaction.

10. The heat-shielding film of claim 9, wherein the D unit or the M unit includes
    a first type in which a vinyl group as the addition-curing reaction group is bound directly to a silicon atom, and
    a second type in which a hydrogen atom reacting with the vinyl group is bound directly to a silicon element, and
    a blending ratio of the first type and the second type as First Type:Second Type is 1:1.

11. The heat-shielding film of claim 10, wherein any of $R^1$ to $R^6$ other than the vinyl group and the hydrogen atom is a methyl group bound directly to a silicon atom.

12. The heat-shielding film of claim 7, further comprising:
    a hollow particle; and
    a nanoparticle, wherein
    a sum of a proportion of the hollow particle and a proportion of the nanoparticle in a total amount of the addition-curing silicone resin, the hollow particle, and the nanoparticle is equal to or greater than 37% by volume and equal to or smaller than 82% by volume.

13. The heat-shielding film of claim 7, wherein a thickness of the heat-shielding film is equal to or greater than 20 μm and equal to or smaller than 150 μm.

14. The heat-shielding film of claim 12, wherein a median diameter of the hollow particle is 30 μm or less.

15. The heat-shielding film of claim 12, wherein a porosity of the hollow particle is equal to or greater than 60% by volume, and is further equal to or greater than 70% by volume.

16. The heat-shielding film of claim 12, wherein the proportion of the hollow particle in the total amount of the addition-curing silicone resin, the hollow particle, and the nanoparticle is equal to or greater than 30% by volume and equal to or smaller than 60% by volume, and further equal to or greater than 40% by volume and equal to or smaller than 55% by volume.

17. The heat-shielding film of claim 7, wherein the addition-curing silicone resin further contains toluene as a solvent and is used as a resin solution.

18. The heat-shielding film of claim 17, wherein the proportion of toluene in the resin solution is equal to or greater than 30% by volume and equal to or smaller than 70% by volume.

19. A heat shielding method for reducing or preventing heat dissipation from a combustion chamber of an engine to the outside by means of the heat-shielding film of claim 7.

* * * * *